(12) United States Patent
Moll et al.

(10) Patent No.: US 11,340,255 B1
(45) Date of Patent: May 24, 2022

(54) METHOD FOR REDUCING BIAS DRIFT IN A MICROELECTROMECHANICAL SYSTEMS SENSOR

(71) Applicant: The United States of America as represented by the Secretary of the Navy, Newport, RI (US)

(72) Inventors: Christopher C Moll, San Jose, CA (US); John G Miskimins, Port Hadlock, WA (US); Ahmed S Zaki, Kingston, RI (US); William H Slater, New Bedford, MA (US); Michael J Kroger, Middletown, RI (US)

(73) Assignee: The United States of America as represented by the Secretary of the Navy

( * ) Notice: Subject to any disclaimer, the term of this patent is extended or adjusted under 35 U.S.C. 154(b) by 0 days.

(21) Appl. No.: 16/989,965

(22) Filed: Aug. 11, 2020

(51) Int. Cl.
*G01P 21/00* (2006.01)
*G01P 15/08* (2006.01)

(52) U.S. Cl.
CPC .......... *G01P 21/00* (2013.01); *G01P 15/0802* (2013.01)

(58) Field of Classification Search
CPC ...................................................... G01P 21/00
See application file for complete search history.

(56) References Cited

FOREIGN PATENT DOCUMENTS

| CN | 106123924 A | * 11/2016 |
| JP | 2018138918 A | * 9/2018 |

* cited by examiner

*Primary Examiner* — Walter L Lindsay, Jr.
*Assistant Examiner* — Andrew V Do
(74) *Attorney, Agent, or Firm* — James M. Kasischke; Michael P. Stanley

(57) ABSTRACT

A method for reducing bias drift in electrical-mechanical systems sensor such as an accelerometer is provided. The method includes the steps of arranging at least one accelerometer in a chamber and initiating a plurality of temperature cycle sets. Each temperature cycle set has a minimum temperature, a maximum temperature, and a ramp rate. The conditioning method monitors the accelerometers until a bias drift is stabilized within a desired bias drift range. The minimum temperature and the maximum temperature limit a temperature range in which the accelerometer is cycled. Use of temperature limiting can quickly accelerate stabilization of the bias drift while also reducing degradation.

2 Claims, 2 Drawing Sheets

METHOD FOR REDUCING BIAS DRIFT IN A MICROELECTROMECHANICAL SYSTEMS SENSOR

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to a method for reducing bias drift in a microelectromechanical system accelerometer.

(2) Description of the Prior Art

Microelectromechanical system accelerometers are used in a variety of applications such as sonar systems and inertial measurement systems. However, the use of these accelerometers in heading assemblies can be limited due to bias drift. Bias drift can include a deviation from true values based on a combination of time, temperature, and acceleration. The bias drift may occur even in stable microelectromechanical system sensors, which may present challenges when used for array sensors that provide heading information.

Additionally, a mechanical mounting of the accelerometer inside the heading sensor can be subject to small deformations resulting in relative motion between the accelerometer and the heading sensor assembly. These deformations can result in inaccurate feedback similar to the bias drift. These issues can affect accuracy despite an initial heading sensor calibration. As such, there is a demand for a conditioning method or process used to stabilize an accelerometer bias drift on a heading sensor.

Previous examples of stabilization include accelerated life testing temperature cycles, which may be applied to heading sensors or other products to age a product and find potential weak points. However, the accelerated life testing temperature cycles process is used to test the limits of the sensor and therefore uses higher and lower extreme temperatures which do not correct a bias drift.

SUMMARY OF THE INVENTION

The present invention comprises a method for reducing bias drift in an accelerometer. The method includes the steps of arranging at least one accelerometer in a chamber and initiating a plurality of temperature cycle sets. Each temperature cycle set has a minimum temperature, a maximum temperature, and a ramp rate.

In this way, the conditioning process of the present invention monitors the accelerometers until a bias drift is stabilized within a desired bias drift range. The minimum temperature and the maximum temperature limit a temperature range in which the accelerometer is cycled. Use of temperature limiting can quickly accelerate stabilization of the bias drift while also reducing degradation.

It is understood that the brief description above introduces concepts that are described in the detailed description. The summary is not intended to identify essential features of the claimed subject matter, the scope of which is defined by the claims that follow the detailed description. Furthermore, the claimed subject matter is not limited to implementations that solve any disadvantages noted above or in any part of the present application.

BRIEF DESCRIPTION OF THE DRAWINGS

Features of illustrative embodiments may be understood from the accompanying drawings in conjunction with the detailed description. The elements in the drawings may not be drawn to scale. Some elements and/or dimensions are enlarged or minimized for the purpose of illustration and the understanding of the disclosed embodiments.

DETAILED DESCRIPTION OF THE INVENTION

The following description relates to various embodiments of a conditioning process used to stabilize accelerometer bias drift on a heading sensor. The heading sensor can be a central control point for an autopilot system, wherein a plurality of sensors including a magnetic field sensor, a compass, or an electrical equivalent is used to provide a magnetic fluxgate that provides heading information.

A heading sensor assembly includes a plurality of microelectromechanical system accelerometers along with magnetometers and other heading sensor components. The sensor can be integrated into an end product, such as a toward array sonar module.

During the conditioning process, the heading sensor assembly is temperature-cycled. The temperature cycling can occur in a chamber, such as an environmental chamber, partially or fully separated from an ambient environment in order to allow accurate tracking of the accelerometer bias. The chamber provides the desired temperature changes and ramp rates while maintaining a humidity at or below a threshold to mitigate condensation on circuitry of the heading sensor.

Figure 1:
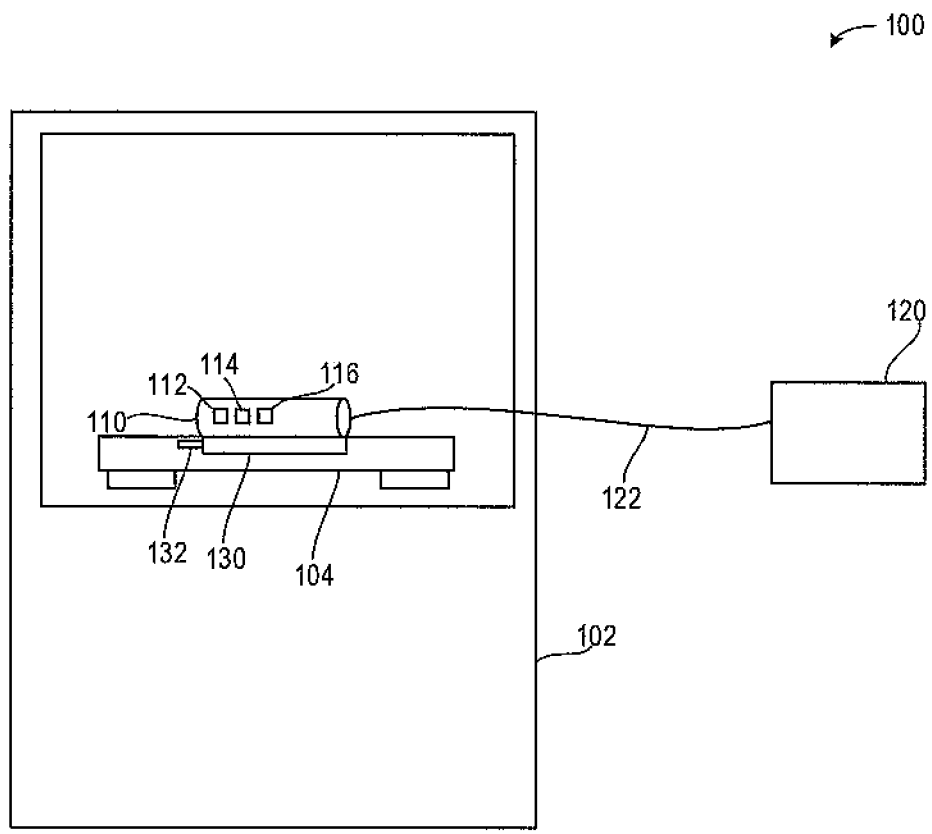
FIG. 1 depicts an example of test equipment for a conditioning process in accordance with the present invention.

As illustrated in FIG. 1, the facility includes equipment to measure the accelerometer bias during the temperature cycles. For example, a vibration isolation table is included so that the accelerometer is only measuring the force of gravity (as opposed to vibrations from a compressor or other device). The facility includes a computer configured to record and display accelerometer output.

The conditioning process can be configured to cycle the accelerometer along with the other components arranged in the sensor assembly through a plurality of temperature cycles. Each temperature cycle set includes adjusting a temperature of the accelerometer to a minimum and a maximum temperature. The accelerometer is maintained at the minimum temperature for a threshold duration before the temperature is raised to and maintained at the maximum temperature for the threshold duration. Temperature cycle sets are accomplished until a bias drift is stabilized at a desired threshold.

Each of the temperature cycle sets can be identical. In another example, at least some of the temperature cycle sets can differ from one another. For example, a first cycle set includes cycles within a first temperature range and a first ramp rate. The first cycle set includes a threshold duration for a temperature soak at the maximum and minimum temperatures of the first temperature range.

A second cycle set includes cycles within a second temperature range and a second ramp rate. The temperature values of the second temperature range overlap with the temperature values of the first temperature range. The second cycle set includes the temperature soak for the threshold duration at the maximum and minimum temperatures of the second temperature range.

A third cycle set includes cycles within a third temperature range and a third ramp rate. The third temperature range includes temperature values overlapping with the first cycle set and the second cycle set. The third cycle set further includes a temperature soak at the maximum and minimum temperatures for the threshold duration.

During the second and third cycle sets, the heading sensor is powered on and the accelerometer data is monitored and recorded. The system accelerometer bias can stabilize as the cycles progress. Each accelerometer of the heading sensor assembly may include a slightly different character (e.g., bias). The second and third cycle sets can be repeated until the accelerometers include a bias stability within a desired range. The bias stability is indicated by the computing device.

The first cycle set can be a phase in-period, wherein data from the accelerometer is tracked. However, data from the accelerometer can be dismissed during the first cycle set as experimental data suggests that bias drift is not sufficiently corrected during this period. Following the first cycle set, the second and third cycle sets would include narrower temperature ranges relative to the first cycle set.

Upon achieving the desired bias stability, a rest period starts. The rest period includes a threshold rest duration at a threshold temperature, wherein the threshold temperature includes an ambient temperature range. Upon completion of the rest period, the second and third temperature cycles are repeated while monitoring biases of the accelerometers. If the biases have shifted since the second and third temperature cycles, then additional conditioning may be accomplished. Additional conditioning includes repeating the second and third temperature cycles along with the rest period until the biases no longer deviate from the desired bias stability.

Returning to FIG. 1, an embodiment 100 of the present invention is depicted with a chamber 102 having a vibration table 104. The chamber 102 can be a facility, a room, a box, or other container separated from an ambient atmosphere. At least one of a temperature, pressure, and humidity of the chamber 102 is adjusted for at least one cycle set for conditioning a microelectromechanical system accelerometer of a heading assembly 110.

In the example of the figure, the heading assembly 110 includes a plurality of microelectromechanical system accelerometers including a first accelerometer 112, a second accelerometer 114, and a third accelerometer 116. The microelectromechanical system accelerometers provide feedback to the heading assembly 110.

The accelerometers may also be soldered to the circuit board of the heading assembly 110. Alternatively, the accelerometers are physically coupled to a circuit board of heading assembly 110 via an underfill. The underfill can be an epoxy or similar bonding agent.

A controller 120 can be positioned outside of the chamber 102 and communicatively coupled to the heading assembly 110 by a cable 122. As described in detail in FIG. 2, the controller 120 completes instructions stored on a non-transitory memory thereof that enable the controller to condition the accelerometers.

Alternatively, the controller 120 is wirelessly connected to the heading assembly 110. The controller 120 is further coupled to a heating device 130 along with a temperature sensor 132, wherein the controller can adjust the heating device 130 to increase, decrease, or hold a temperature applied to the heading assembly 110. The temperature sensor 132 provides feedback to the controller 120 so that a temperature of the heading assembly 110 during the conditioning procedure is known.

Figure 2:
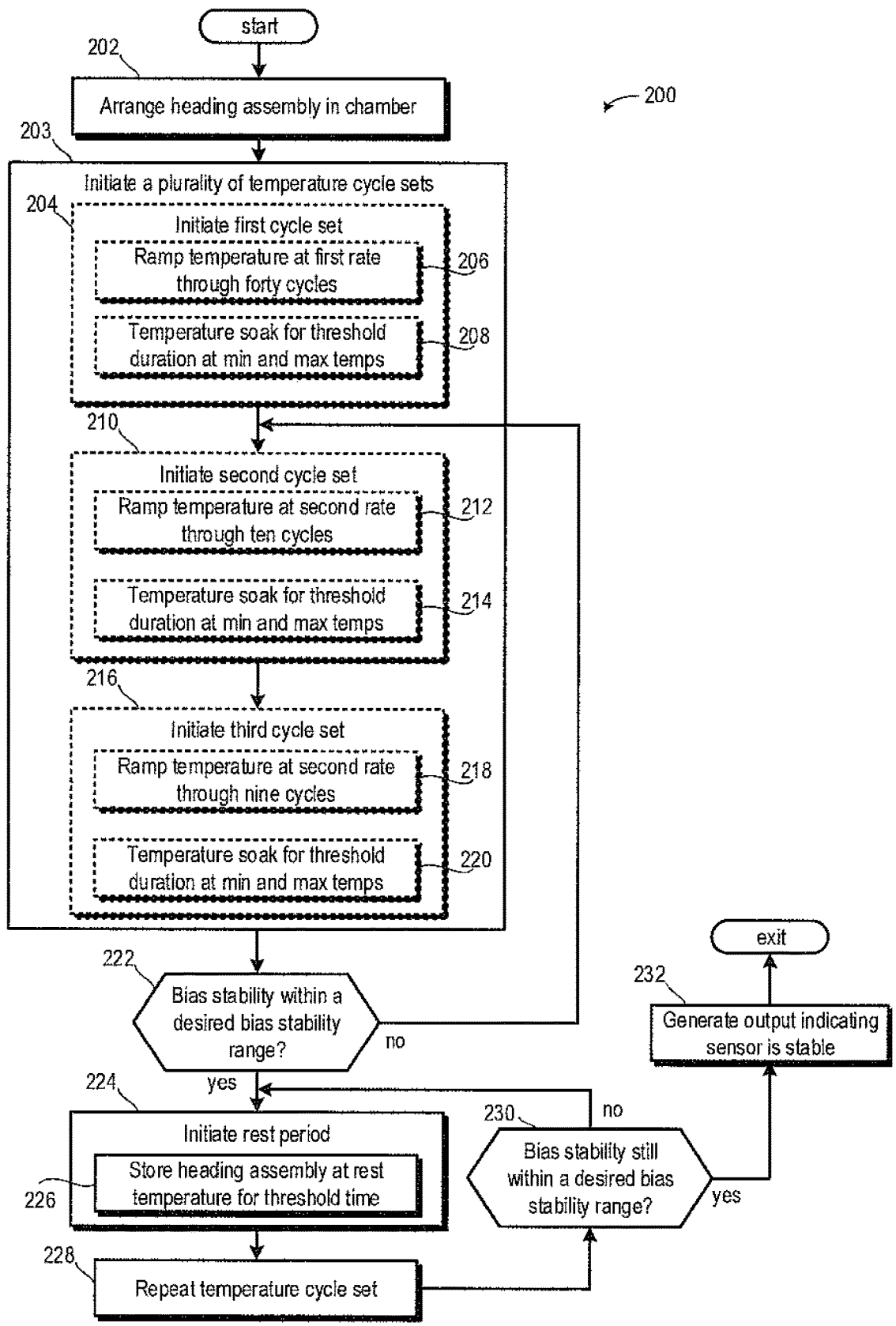
FIG. 2 depicts a flow chart illustrating the conditioning process in accordance with the present invention.

FIG. 2 depicts a flow chart illustrating the conditioning process or method in accordance with the present invention. Instructions 200 for carrying out method may be executed by a controller based on the instructions stored on a controller memory and in conjunction with signals received from the sensors of the chamber, described with reference to FIG. 1.

The method 200 starts at Step 202, which includes arranging a heading assembly in a chamber. The heading assembly is the heading assembly 110 and the chamber is chamber 102 of FIG. 1. The heading assembly 110 includes a plurality of microelectromechanical system accelerometers physically coupled to a circuit board.

The method 200 proceeds to Step 203, which includes initiating temperature cycle sets. As described above, a temperature cycle set includes a minimum temperature and a maximum temperature, at each of which a temperature soak occurs. The temperature cycle set further includes a ramp rate at which a temperature of the accelerometer is adjusted.

The method 200 proceeds to Step 204, which includes initiating a first cycle set of the conditioning method. The first cycle set includes a first temperature range. The first temperature range can be between −55° C. to 80° C. The first cycle set includes a first ramp rate at which the temperature is ramped through forty cycles at Step 206. The first cycle set also includes a temperature soak for a threshold duration at a minimum and a maximum temperature at Step 208.

The first cycle set can include where the temperature is set to a minimum temperature, such as equal to −55° C. in one of the forty cycles, for a threshold duration. The threshold duration can be equal to one hour.

The temperature of the heading assembly 110 is increased at the first ramp rate of 3° C./minute. Once a maximum temperature of the first cycle set is reached, which may be as high as 80° C. for at least one of the forty cycles; the temperature soak for the threshold duration is accomplished and one cycle of the forty cycles is complete. Upon completion of the forty cycles, the first cycle set is complete.

Each cycle of the forty cycles can include a different minimum temperature from which the cycle begins and a different maximum temperature at which the cycle ends. This may provide a greater stabilization of the accelerometers.

The method 200 may optionally proceed to Step 210, which includes initiating a second cycle set. The second cycle set includes a second ramp rate through ten cycles at Step 212 within a temperature range from −54° C. to 71° C. The second ramp rate can be 10° C./minute. At step 214, the second cycle set further includes a temperature soak for a threshold duration at minimum and maximum temperatures.

The second cycle set can include where the temperature is set to a minimum temperature, such as −54° C. in one of the ten cycles. The temperature soak is accomplished for the threshold duration at the minimum temperature before increasing the temperature equal to the second ramp rate. Upon reaching a maximum temperature of 71° C., the temperature soak is again accomplished for the threshold duration and one cycle of the ten cycles of the second cycle set is complete. Upon completion of the ten cycles, the second cycle set is complete.

Each cycle of the ten cycles of the second cycle set can include a different minimum temperature from which the cycle begins and a different maximum temperature at which the cycle finishes. This may provide a greater stabilization of the accelerometers.

The method 200 may optionally proceed to Step 216, which includes initiating the third cycle set. The third cycle set includes a third ramp rate through nine cycles at Step 218 within a temperature range from −54° C. to 71° C. The third ramp rate can be 1° C./minute. At Step 220, the third cycle set further includes a temperature soak for the threshold duration at minimum and maximum temperatures.

The third cycle set includes where the temperature is reduced a minimum temperature, such as −54° C. in each of the nine cycles. The temperature soak is executed for the threshold duration at the minimum temperature before increasing the temperature at a rate equal to the third ramp rate to a maximum temperature, such as 71° C. in each of the nine cycles. Upon completion of the nine cycles, the third cycle set is complete.

Each cycle of the nine cycles of the third cycle set can include a different minimum temperature from which the cycle begins and a different maximum temperature at which the cycle finishes. This may provide a greater stabilization of the accelerometers.

In the method 200, each of the temperature cycle sets can be identical. In such a case, each temperature cycle set includes an identical minimum temperature, an identical maximum temperature, an identical ramp rate, and an identical threshold duration. The method 200 can execute temperature cycle sets (e.g., 50 or more), and then compares a sensed bias drift to a desired bias stability.

In some examples, the minimum temperature may be between −10° C. to −60° C. In some examples, the minimum temperature is between −10° C. to −40° C. Alternatively, the minimum temperature is between −10° C. to −25° C. In some examples, the maximum temperature may be between 30° C. to 80° C. Alternatively, the maximum temperature may be between 30° C. to 60° C. Alternatively, the maximum temperature may be between 30° C. to 45° C.

Thus, the method 200 includes embodiments where each of the temperature cycle sets is identical or where there is are different temperature cycle sets for reducing the bias drift. Following completion of the temperature cycle sets, the method 200 proceeds to Step 222, which includes determining if a bias stability is within a desired bias stability range. The microelectromechanical system accelerometer feedback is monitored and recorded via the computing system.

The accelerometer bias may stabilize as the second and third cycles progress. Each accelerometer may include slightly different bias characteristics. If each accelerometer does not include a bias value within the desired bias stability range, then the temperature cycles can be repeated.

A number of repeated cycles can be fewer than a number of previously completed temperature cycles. For example, prior to comparing the bias stability to the desired bias stability range, 70 temperature cycles are executed. Following a comparison where the bias stability is still outside of the desired range, 20 temperature cycles may be repeated. The repeated temperature cycles can be identical to or different than one another.

If the bias of each accelerometer is within the desired stability range, then the method 200 proceeds to Step 224, which includes initiating a rest period. At Step 226, the method 200 includes storing the heading assembly 110 at room temperature for a threshold time. The room temperature can be between 19° C. to 25° C. and the threshold time can be 72 hours. The temperature and time of the rest period can be adjusted without departing from the scope of the present invention.

The method 200 proceeds to Step 228, which includes repeating the second and third cycle sets, as described above at Step 210 and Step 216. As such, the heading assembly 110 is powered on and bias values from the accelerometers are monitored.

The method 200 proceeds to Step 230, which includes determining if the bias stability of each accelerometer is still within the desired bias stability range. If the bias stability of at least one of the accelerometers is no longer within the desired range; then the method 200 proceeds to Step 224 and initiates the rest period.

If the bias stability of each accelerometer is still within the desired bias stability range, then the method 200 proceeds to Step 232, which includes generating an output indicating the sensor is stable. As such, the microelectromechanical system accelerometer in the heading assembly 110 can be utilized for detecting acceleration forces.

In this way, the bias drift of the microelectromechanical system accelerometers are adjusted to meet a desired bias drift range via the conditioning method. The conditioning method or process cycles the accelerometers through a range of temperatures within their operating range until the bias drift stabilizes to a value within a desired bias stability range. The technical effect of the conditioning process is to more rapidly stabilize the bias drift of the sensors while avoiding temperature ranges used to age the accelerometers.

It will be appreciated that the configurations disclosed herein are exemplary in nature, and that these embodiments are not to be considered as limiting, because variations are possible. The present invention includes novel and non-obvious combinations and sub-combinations of the various systems and configurations, and other features, functions, and/or properties disclosed herein.

What is claimed is:

1. A method for reducing bias drift in an accelerometer, said method comprising the steps of:
    arranging at least one accelerometer in a chamber;
    initiating a plurality of temperature cycle sets wherein each temperature cycle set includes a minimum temperature, a maximum temperature, and a ramp rate;
    maintaining the at least one accelerometer off during a portion of the plurality of temperature cycle sets wherein the at least one accelerometer is a microelectromechanical system accelerometer;
    powering the at least one accelerometer on during a portion of the plurality of temperature cycle sets;
    monitoring stability data of the at least one accelerometer;
    initiating a rest period upon completion of said step of powering the at least one accelerometer on during a portion of the plurality of temperature cycle sets in which said initiating step is capable of responding to a bias drift of the at least one accelerometer and then is capable of being within a desired bias drift range;

storing the at least one accelerometer within the rest period between 19° C. to 25° C. for a temperature threshold;
repeating a portion of the plurality of temperature cycle sets following the rest period; and
repeating the rest period and the portion of the plurality of temperature cycle sets in response to the bias drift being outside of the desired bias drift range.

2. The method of claim 1, wherein the plurality of temperature cycle sets comprises greater than forty identical temperature cycle sets.

\* \* \* \* \*